United States Patent
Choi et al.

(10) Patent No.: US 9,131,194 B2
(45) Date of Patent: Sep. 8, 2015

(54) DISPLAY APPARATUS WITH A 3D SYNCHRONIZATION SIGNAL TRANSMITTER DISPOSED THEREIN

(75) Inventors: Hoon Choi, Hwaseong-si (KR); Hyeon-Joo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 399 days.

(21) Appl. No.: 12/973,332

(22) Filed: Dec. 20, 2010

(65) Prior Publication Data

US 2011/0148869 A1    Jun. 23, 2011

(30) Foreign Application Priority Data

Dec. 21, 2009 (KR) .......................... 10-2009-0128114

(51) Int. Cl.
*H04N 5/64* (2006.01)
*H04N 13/04* (2006.01)

(52) U.S. Cl.
CPC .............. *H04N 5/64* (2013.01); *H04N 13/0438* (2013.01); *H04N 2213/001* (2013.01)

(58) Field of Classification Search
CPC ......... H04N 5/64; H04N 5/645; H04N 5/655; H04N 1/00519; H05K 5/0017
USPC ........................... 348/56; 361/679.01–679.59; 248/917–924; 312/223.1–223.2; 349/58–60
See application file for complete search history.

(56) References Cited

U.S. PATENT DOCUMENTS

| | | | |
|---|---|---|---|
| 5,455,743 A * | 10/1995 | Miyajima | 361/781 |
| 5,654,749 A * | 8/1997 | Kanno | 348/56 |
| 6,188,442 B1 | 2/2001 | Narayanaswami | |
| 7,423,377 B2 | 9/2008 | Kim et al. | |
| 2001/0043266 A1* | 11/2001 | Robinson et al. | 348/53 |
| 2006/0081707 A1* | 4/2006 | Yang | 235/441 |
| 2006/0250523 A1 | 11/2006 | Kuwajima et al. | |
| 2007/0091223 A1* | 4/2007 | Maruta et al. | 349/58 |
| 2009/0199246 A1* | 8/2009 | Koch | 725/81 |
| 2009/0225502 A1* | 9/2009 | Cheng et al. | 361/679.01 |
| 2009/0237327 A1* | 9/2009 | Park et al. | 345/8 |
| 2010/0150529 A1* | 6/2010 | Leichsenring et al. | 386/95 |
| 2011/0025821 A1* | 2/2011 | Curtis et al. | 348/43 |
| 2011/0122238 A1* | 5/2011 | Hulvey et al. | 348/56 |

FOREIGN PATENT DOCUMENTS

| | | |
|---|---|---|
| CN | 1615073 A | 5/2005 |
| CN | 1829296 A | 9/2006 |
| KR | 10-0383801 B1 | 5/2003 |

OTHER PUBLICATIONS

Communication dated Mar. 23, 2011 from the European Patent Office in counterpart European application No. 10195411.3.

(Continued)

*Primary Examiner* — Kee M Tung
*Assistant Examiner* — Ryan D McCulley
(74) *Attorney, Agent, or Firm* — Sughrue Mion, PLLC

(57) ABSTRACT

A display apparatus in which a user can view a 3D image using shutter glasses is provided. The display apparatus, in which a user can view a three-dimensional (3D) image using shutter glasses, may include: a cover; a display module which is disposed in the cover and displays an image; and a transmitter which is disposed in the cover and transmits a synchronization signal to the shutter glasses to synchronize the image displayed by the display module with the shutter glasses.

10 Claims, 14 Drawing Sheets

(56) References Cited

OTHER PUBLICATIONS

Communication, dated Oct. 23, 2013, issued by the European Patent Office, in counterpart Application No. 13181852.8.

Communication, dated Mar. 5, 2014, issued by the State Intellectual Property Office of P.R. China in counterpart Chinese Patent Application No. 201010598272.8.

Communication dated Apr. 28, 2015, issued by the Korean Intellectual Property Office in counterpart application No. 10-2009-0128114.

Communication dated May 13, 2015, issued by the European Patent Office in counterpart application No. 15156177.6.

* cited by examiner

DISPLAY APPARATUS WITH A 3D SYNCHRONIZATION SIGNAL TRANSMITTER DISPOSED THEREIN

CROSS-REFERENCE TO RELATED APPLICATION

This application claims priority from Korean Patent Application No. 10-2009-0128114, filed on Dec. 21, 2009 in the Korean Intellectual Property Office, the disclosure of which is incorporated herein by reference.

BACKGROUND

1. Field

Apparatuses and methods consistent with the exemplary embodiments relate to a display apparatus which is improved to view three dimensional images using shutter glasses.

2. Description of the Related Art

A display apparatus processes an input image signal for display. The display apparatus generally includes a display unit which includes a display module for displaying an image, a driving circuit part which receives and processes an image signal. Recently, a display apparatus has been developed for providing three dimensional (hereinafter, referred to as 3D) images. In this display apparatus, in order to provide 3D images to a user, it is necessary to divide a 3D image provided from the display apparatus into a left-eye image and a right-eye image and to display the divided left-eye and right-eye images to be suitable for left and right eyes of the user.

In order for the user to experience a 3D image using the divided left-eye and right-eye images, there are provided shutter glasses through which the user can alternately view the left-eye and right-eye images; and a transmitter for synchronizing the shutter glasses with the left-eye and right-eye images provided from the display apparatus. The transmitter receives a synchronization signal from the display apparatus and transmits the synchronization signal to the shutter glasses. However, the transmitter is separately provided with respect to the display apparatus.

SUMMARY

An aspect of the present invention provides display apparatus in which a user can view a three-dimensional (3D) image using shutter glasses, wherein the apparatus may include: a cover; a display module which is disposed in the cover and displays an image; and a transmitter which is disposed in the cover and transmits a synchronization signal to the shutter glasses to synchronize the image displayed by the display module with the shutter glasses.

The cover may include a front cover member which covers a front part of the display module and a rear cover member which covers a rear part of the display module, wherein the transmitter may be disposed on a rear surface of the front cover member, and wherein the front cover member may include a transmitter penetration hole extending from the rear surface of the front cover member to which the transmitter is installed toward a front surface of the front cover member such that the synchronization signal is transmitted toward the shutter glasses.

The front cover member may include a transmitter mount to which the transmitter is mounted.

The apparatus may further include: a driving circuit which processes an image signal to drive the display module; and a transmitter cable which electrically connects the driving circuit with the transmitter, wherein the front cover member includes a cable accommodating part which accommodates at least a portion of the transmitter cable.

The driving circuit may include at least one printed circuit board on which a plurality of electronic circuit elements is mounted, and the at least one printed circuit board may be disposed on a rear surface of the display module and is accommodated in the cover.

The apparatus may further include: a stand unit which supports the cover and the display module; and a base which supports the stand unit, wherein the base may be provided as a main body unit which accommodates at least a portion of the driving circuit.

The driving circuit may include: a power board which supplies electric power to the display module; and a main board which processes the image signal and supplies the processed image signal to the display module, wherein the power board and the main board may be accommodated in the main body unit.

The transmitter may be disposed at a lower region of the cover.

The apparatus may further include: a remote control receiver which is disposed inside of the cover and receives a control signal from a remote controller, wherein the transmitter is provided integrally with the remote control receiver.

The display apparatus may further include: a driving circuit which drives the display module; and a transmitter cable which connects the driving circuit with the transmitter, wherein a cable accommodating part which accommodates the transmitter cable may be provided inside of the cover.

Another aspect of the present invention provides a display apparatus which displays images for viewing with shutter glasses, wherein the apparatus may include: a cover; a display module which may be disposed in the cover and displays an image; a transmitter which may be disposed in the cover and transmits a synchronization signal to synchronize the image displayed by the display module with the shutter glasses; and a remote control receiver which may be disposed inside of the cover and receives a control signal from a remote controller, wherein the remote control receiver and the transmitter may be disposed separately inside the cover.

The transmitter and the remote control receiver may be provided at a lower region of the cover.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
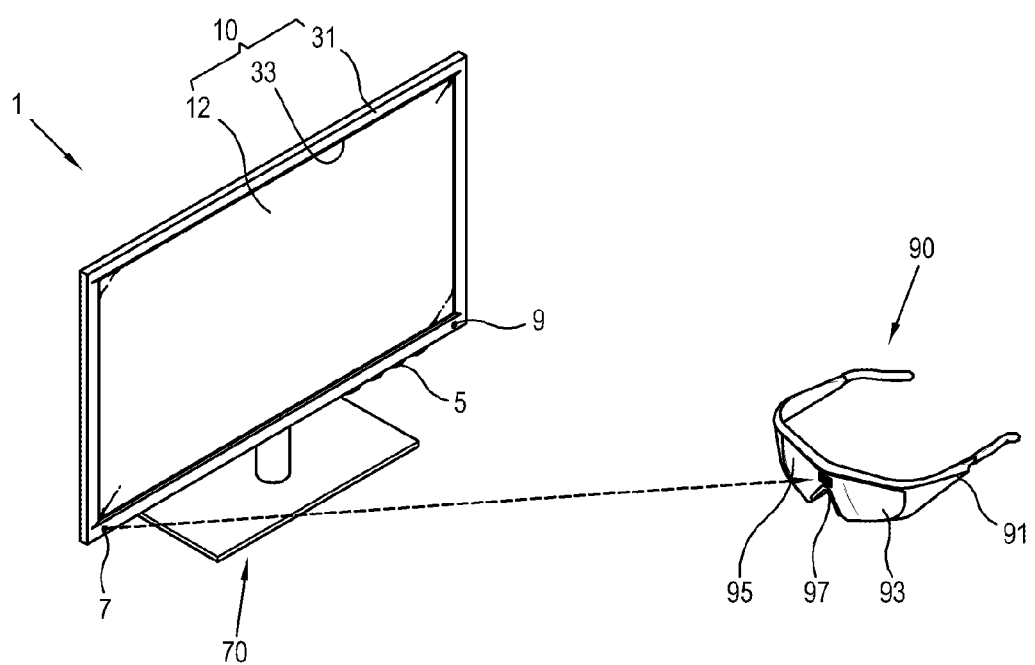
FIG. 1 is a perspective view illustrating a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

A display apparatus 1 according to an exemplary embodiment as shown in FIGS. 1 to 6 is configured so that a user can view a 3D image using shutter glasses 90. The display apparatus 1 according the present exemplary embodiment may include a cover 31; a display module 11 which is surrounded by the cover 31 and displays an image; and a transmitter 41 which is installed in the cover 31 and transmits a synchronization signal for synchronizing the image displayed through the display module with the shutter glasses 90.

More generally, the display apparatus 1 according to the present exemplary embodiment may include a display unit 10 for forming and displaying an image; and a stand unit 70 for supporting the display unit 10. The display apparatus 1 may be wall-mounted, without the stand unit 70.

Figure 2:
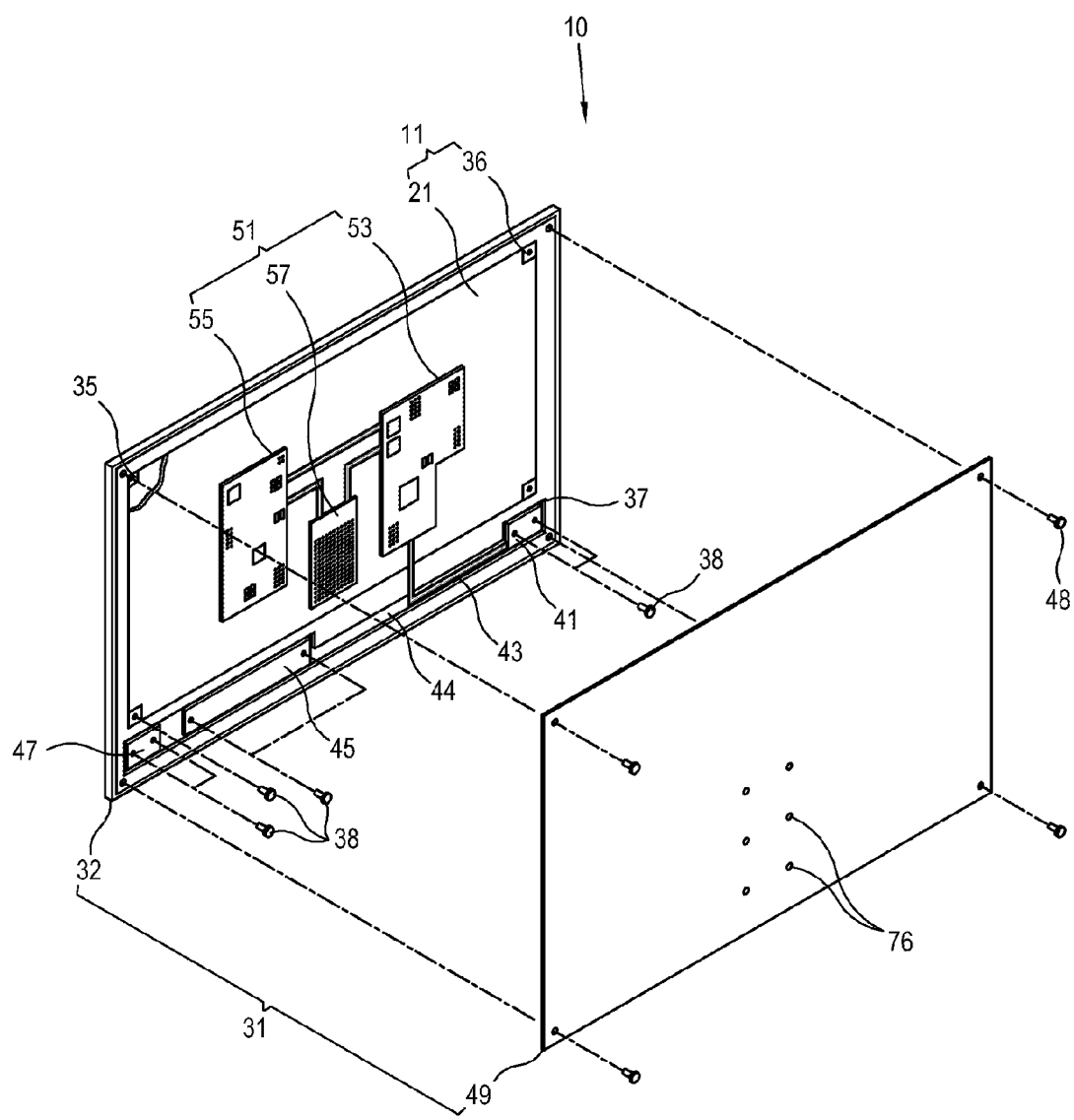
FIG. 2 is a partially exploded perspective view illustrating a display unit in the display apparatus, an example of which is shown in FIG. 1.
Figure 3:
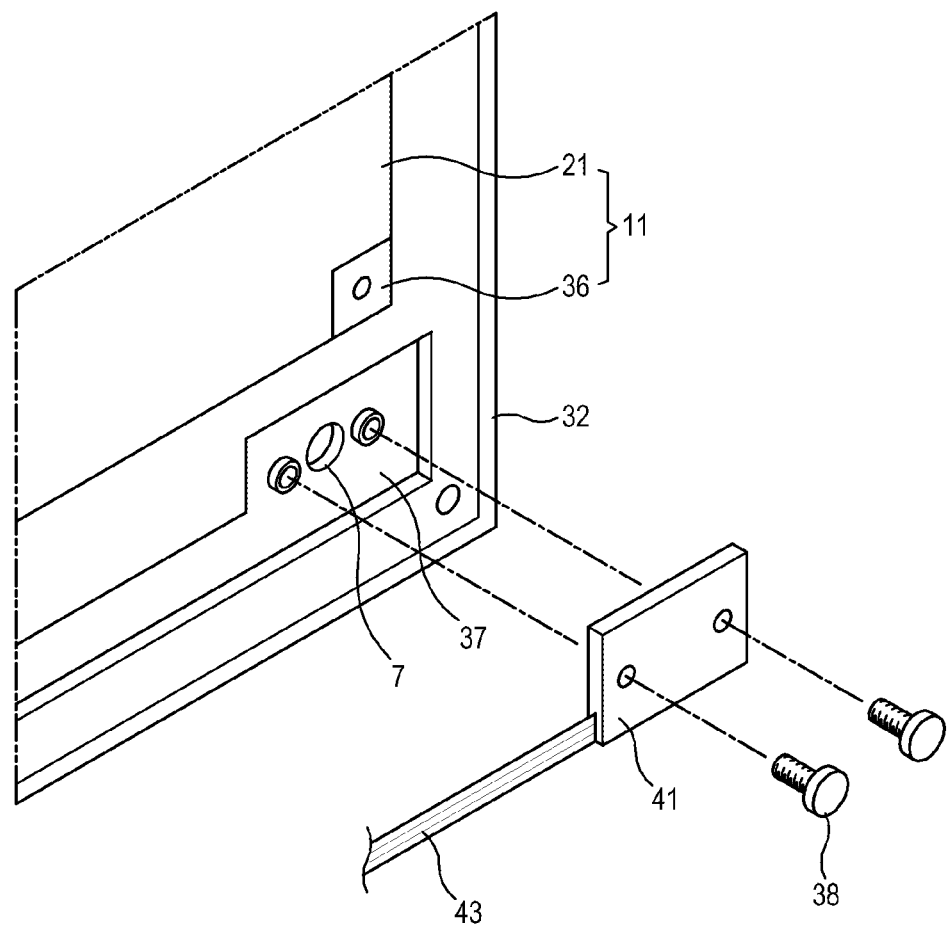
FIG. 3 is an enlarged perspective view illustrating part of the display unit, an example of which is shown in FIG. 1.
Figure 4:
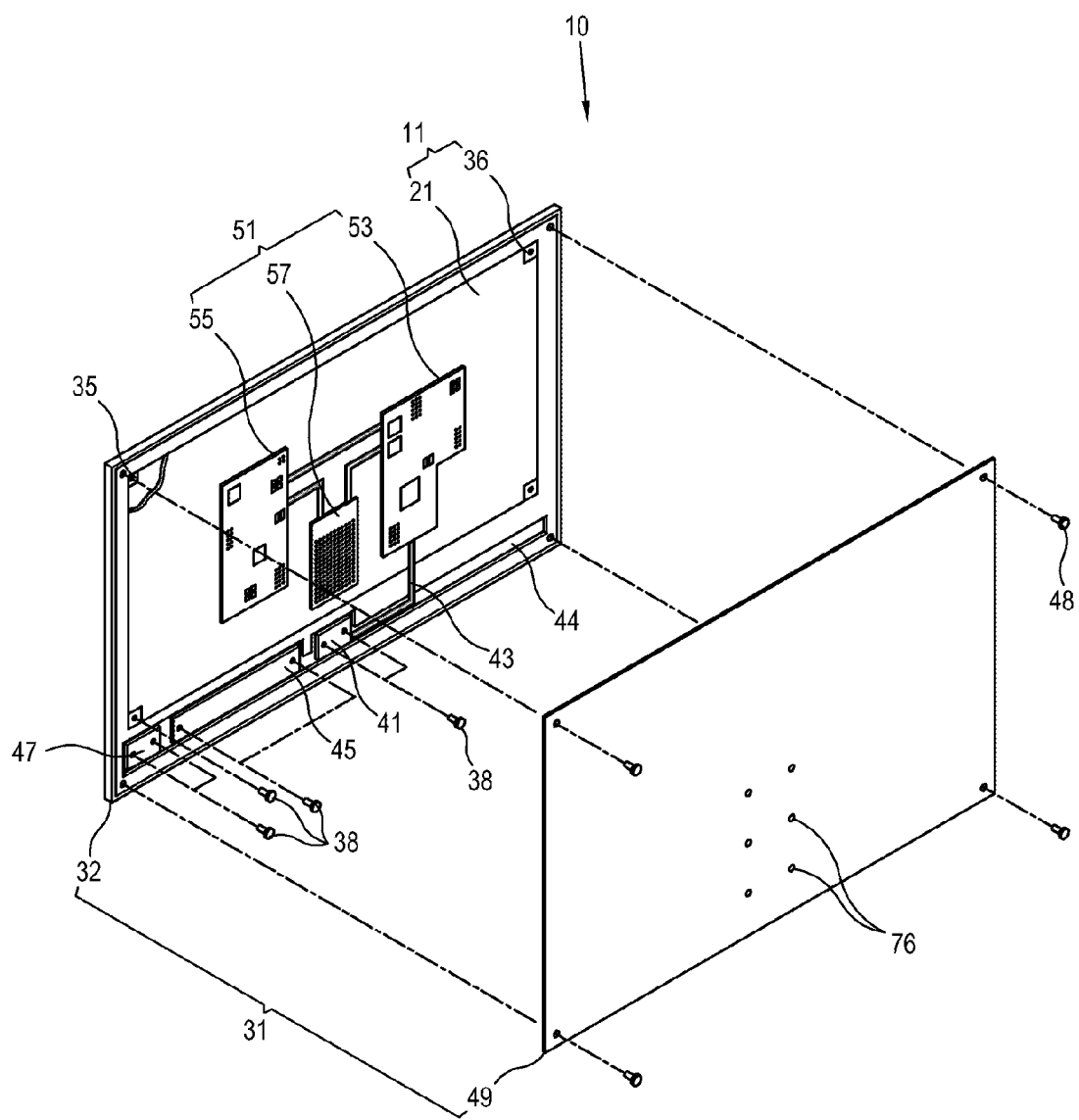
FIG. 4 and FIG. 5 are partially exploded perspective views illustrating another example of the display unit, an example of which is shown in FIG. 2.

As shown in FIGS. 1 to 3, the display unit 10 includes the cover 31; the display module 11; and a driving circuit 51 for driving the display module 11. The display unit 10 may further include a user input part 5.

The display module 11 displays an image on the basis of an image signal processed in the driving circuit 51. The display module 11 may include a display panel 12; a backlight unit (not shown) which emits light toward the display panel 12; and a rear chassis 23 which accommodates and supports the display panel 12 and the backlight unit. The backlight unit may use LEDs as a light source, or may use a linear light source such as a Cold Cathode Fluorescent Lamp (CCFL) or External Electrode Fluorescent Lamp (EEFL), or a point light source such as a Carbon Nanotube (CNT). The backlight unit may be embodied as an edge type in which the light source is installed at a side region of the display module 11, or a direct type in which the light source is installed on a rear region of the display module 11.

The display module 11 may include a display panel such as an LCD panel, an OLED panel or a PDP panel, or a reflective display panel which does not need a separate light source. The display unit 10 may further include a speaker (not shown) for audio output.

The user input part 5 may be installed in a front cover member 32 of the cover 31, and includes a plurality of function keys for performing broadcasting channel change, screen adjustment, sound adjustment and the like. The user input part 5 may be installed so as to be downwardly protruded from a bottom surface of the front cover member 32, or may be in a front or side surface thereof.

The cover 31 includes the front cover member 32 which covers a front part of the display module 11; and a rear cover member 49 which covers a rear part of the display module 11.

The front cover member 32 is formed with an opening part 33 through which an image displayed through in the display module 11 is exposed to the outside. According to the present exemplary embodiment, on a rear surface of the front cover member 32 may be provided a plurality of module supports 35 for supporting the display module 11, and a transmitter mount 37 to which the transmitter 41 is mounted. Further, on the rear surface of the front cover member 32 a remote control receiver 47, for receiving a control signal outputted from a remote controller (not shown), may be installed by means of screws 38. Further, on the rear surface of the front cover member 32 a user input board 45 corresponding to the user input part 5 may be installed by means of screws 38.

According to a modified example, at least one of the module supports 35 and the transmitter mount 37 may be installed in the rear cover member 49, and at least one of the remote control receiver 47 and the user input board 45 may be installed in the rear cover member 49.

According to the present exemplary embodiment, the plurality of module supports 35 which is provided in the rear surface of the front cover member 32 is coupled with a plurality of module coupling parts 36 which is provided in corner regions of the display panel 21 by means of screws. The display module 11 includes the plurality of module coupling parts 36 and the display panel 21. The transmitter mount 37 may be recessed in the rear surface of the front cover member 32 to accommodate the transmitter 41 having a substrate shape, or may have other various configurations to which the transmitter 41 can be installed. The transmitter mount 37 may be coupled with the transmitter 41 by means of screws 38.

As shown in FIG. 1, the front cover member 32 may be formed with a transmitter penetration hole 7 which penetrates the transmitter mount 37 frontward such that the transmitter 41 can transmit a synchronization signal to the shutter glasses 90 through the transmitter penetration hole 7. Further, the front cover member 32 may be formed at another front lower region thereof with a receiver hole 9, through which the remote control receiver 47 receives a control signal outputted from the remote controller. A lens made of transparent materials may be provided in at least one of the transmitter penetration hole 7 and the receiver hole 9 so that a variety of signals such as a synchronization signal and an infrared signal can pass therethrough.

The transmitter 41 transmits a synchronization signal to the shutter glasses 90 so that a left eye shutter 93 and a right eye shutter 95 of the shutter glasses 90 can be opened and closed in synchronization with an image displayed through the display module 11. The synchronization signal may be transmitted for one pair of a left-eye image and a right-eye image, that is, for two image frames, or may be transmitted for one image frame. The transmitter 41 may perform communication with the a signal receiving part 97 of the shutter glasses 90 through infrared communication, wireless communication such as Bluetooth, RF (Radio Frequency) communication or the like. The shutter glasses 90 may include a main body 91, the left eye shutter 93, the right eye shutter 95, the signal receiving part 97 which is installed in the main body 91 and receives the synchronization signal, and a controller (not shown) for controlling these components. Further, in the shutter glasses 90 may be provided a battery (not shown) for supplying driving power to the left eye shutter 93, the right eye shutter 95, the signal receiving part 97 and the controller. A control signal for controlling the shutter glasses 90 may be transmitted to the shutter glasses 90 from the transmitter 41, in addition to the synchronization signal.

Figure 5:
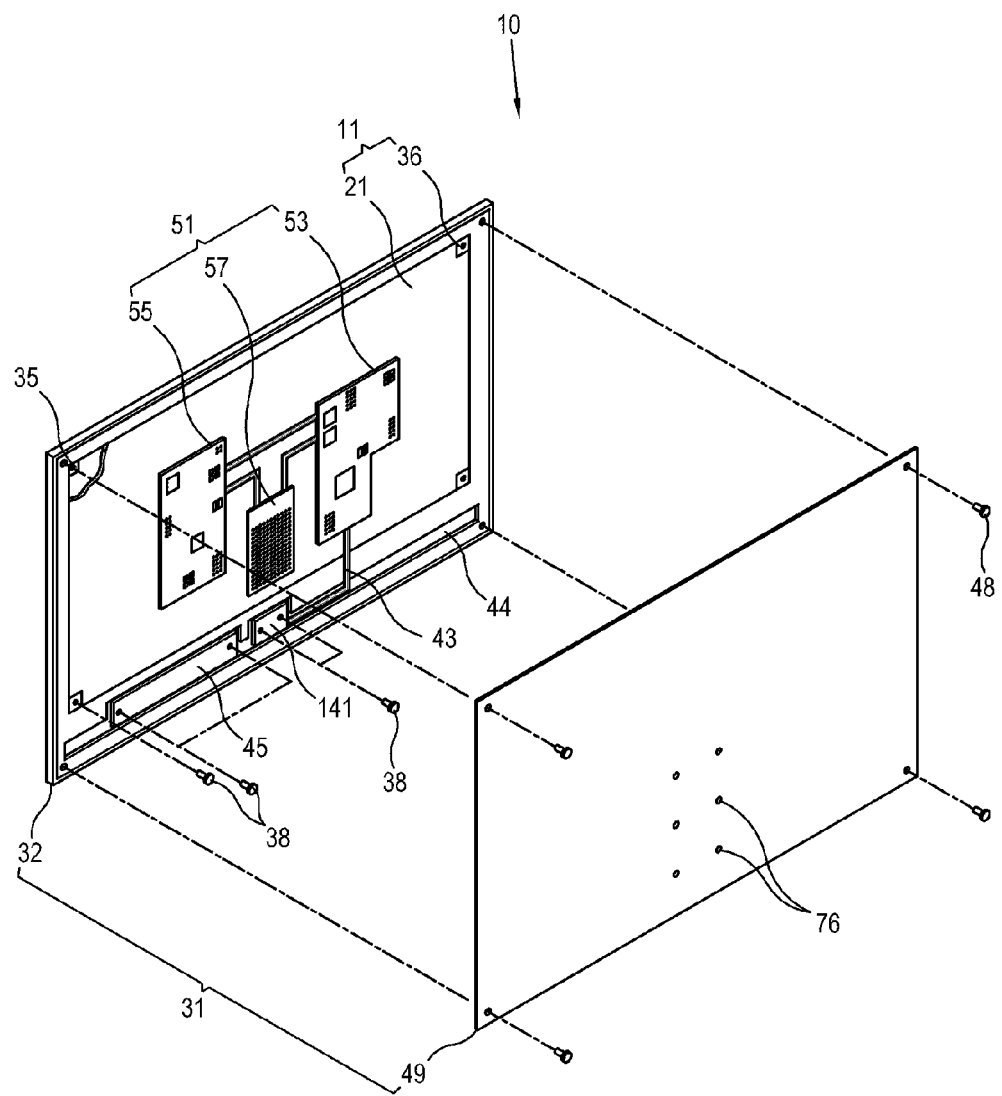

The transmitter 41 is mounted on the transmitter mount 37 which is arranged in a lower region of the rear surface of the front cover member 32, as shown in FIG. 2. Alternatively, the transmitter 41 may be provided in a lower center region of the rear surface of the front cover member 32. According to another exemplary embodiment, as shown in FIG. 5, the transmitter 41 and the remote control receiver 47 may be integrally provided as a signal transmitting and receiving part 141.

According to the present exemplary embodiment, the transmitter 41 is electrically connected with the driving circuit 51 through a transmitter cable 43. Inside of the cover 31 may be provided a cable accommodating part 44 for accommodating and supporting the transmitter cable 43. For example, the cable accommodating part 44 may be provided in a lower region of the rear surface of the front cover member 32. Alternatively, the cable accommodating part 44 may be provided in another region such as a side region of the rear surface of the front cover member 32, or may be in the rear cover member 49. The transmitter cable 43 may be provided as a wire type, a flexible printed circuit board type, or the like. Further, the transmitter 41 may be provided as a transmitting IC, and in this case, the transmitter cable 43 may be electrically connected with the transmitting IC through a printed circuit board.

The driving circuit 51 may include a main board 53 for driving the display module 11; a power board 55 for supplying electric power to the display module 10; and a timing controller 57 for controlling time difference generated when the image signal processed in the main board 53 is displayed through the display module 11. The driving circuit 51 may be mounted on the rear surface of the display module 11, as shown in FIGS. 2 and 3, or may be mounted on the rear cover member 49. The main board 53 may output various control signals for driving the display module 11, and may process broadcast signals, image signals, audio signals or the like received from the outside.

Figure 6:
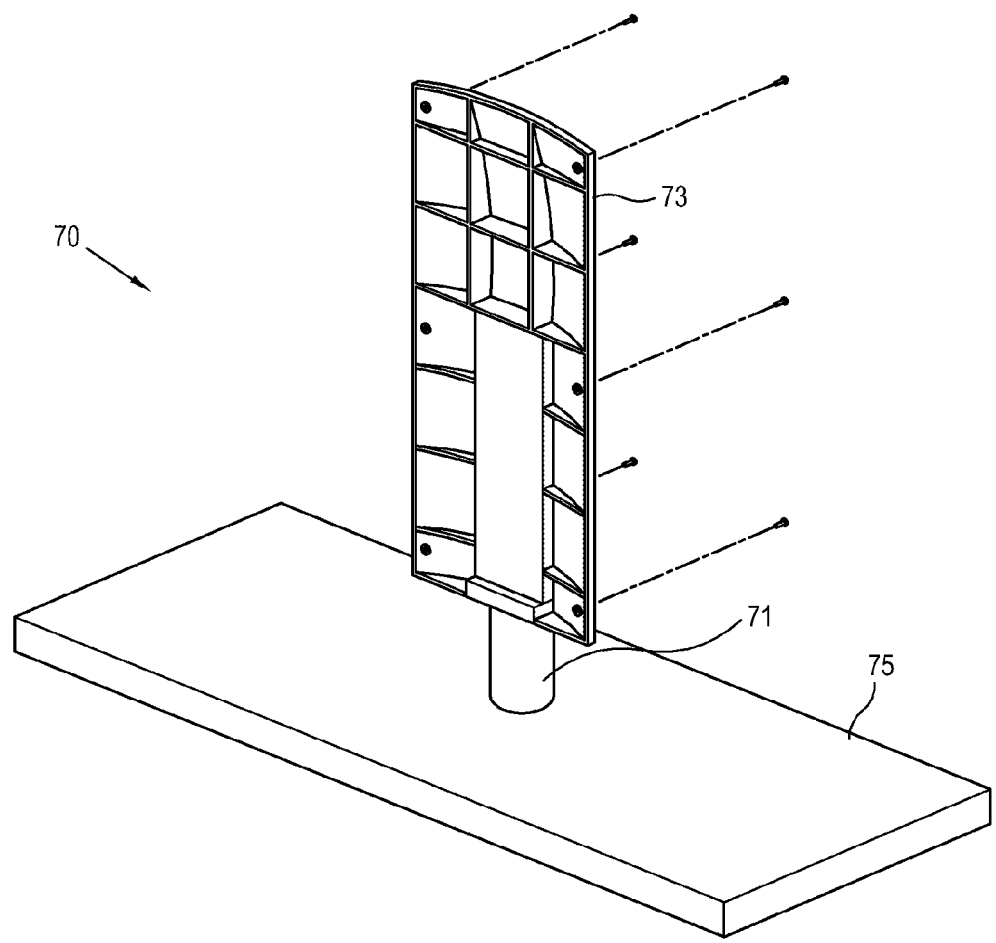
FIG. 6 is a perspective view illustrating a stand unit in the display apparatus, an example of which is shown in FIG. 1.

As described above, the display apparatus 1 according to the present exemplary embodiment may include the stand unit 70 which supports the display unit 10 and is put on an installation surface such as a table, as shown in FIG. 6. The stand unit 70 may include a base 75 which is put on the installation surface; a stand member 71 which is installed into the base 75 to be extended upward; a display support 73 which connects the stand member 71 to the display unit 10 by means of screws 74 or the like. The display support 73 may be coupled with a stand coupling part 76 (refer to FIG. 2) which is provided in the rear cover member 49 by means of the screws 74 or the like. In this way, in the display apparatus 1 according to present exemplary embodiment, the display unit 10 may be coupled with the stand unit 70 in a stand type. Alternatively, the display unit 10 may be installed in a wall-mounted type using a wall-mounting means such as a wall-mounting jig or a wire.

As described above, since the transmitter 41 is installed inside of the cover 31, the display apparatus 1 according to the present exemplary embodiment can have a simplified configuration and enhance user convenience without a separate cable for connecting the transmitter and the display apparatus 1, compared with the configuration that the transmitter 41 is separately provided with respect to the display apparatus 1.

Figure 7:
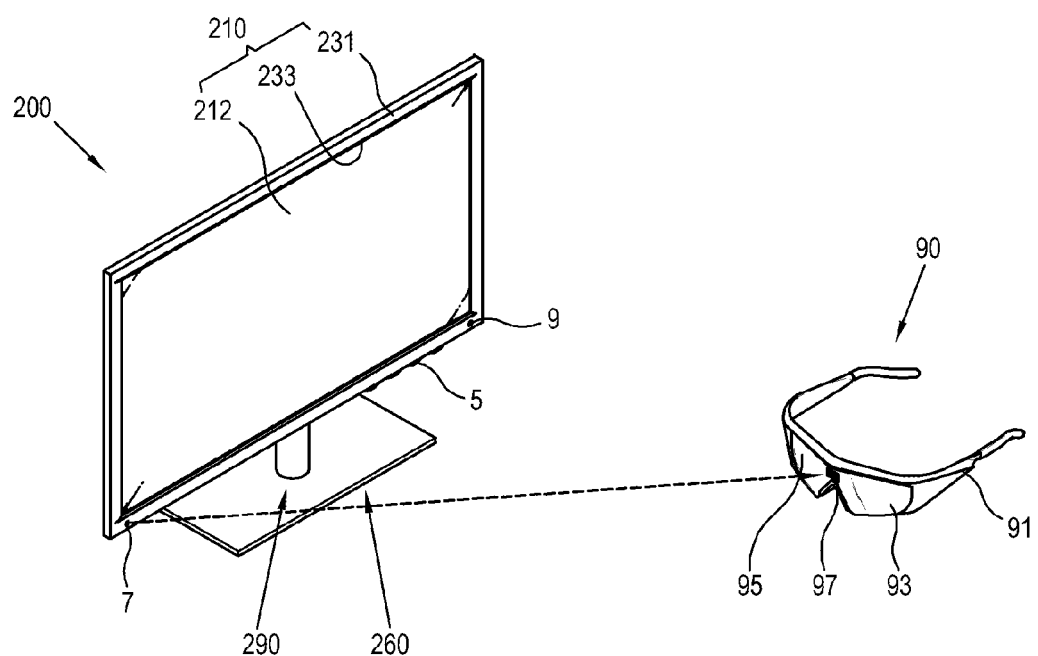
FIG. 7 is a perspective view illustrating a display apparatus according to another exemplary embodiment.
Figure 8:
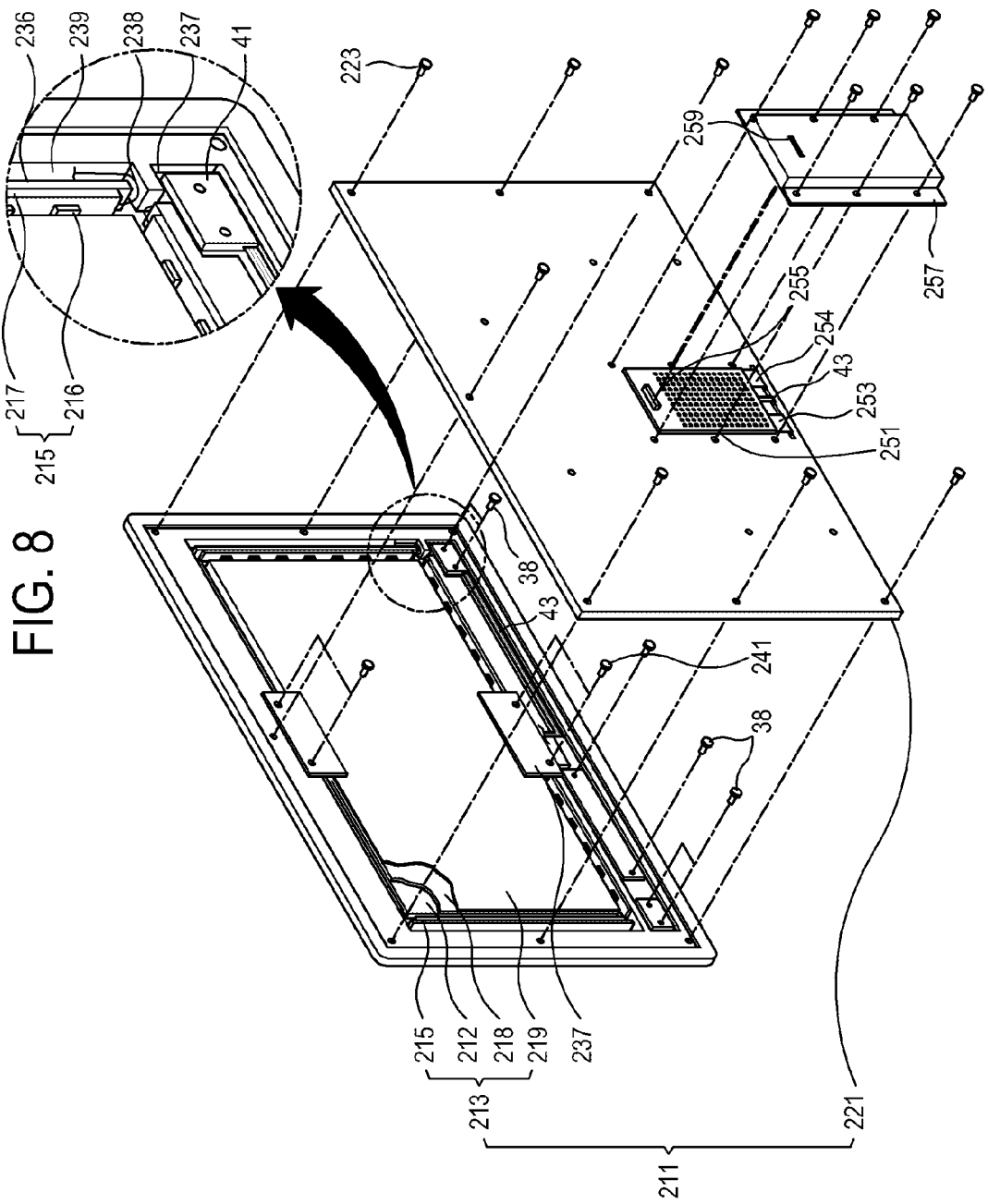
FIG. 8 is a partially exploded perspective view illustrating a display unit in the display apparatus, an example of which is shown in FIG. 7.

As shown in FIGS. 7 to 11, a display apparatus 200 according to another exemplary embodiment has a characteristic that a driving circuit 264 for driving a display module 211 is separately provided with respect to a display unit 210. As shown in FIGS. 7 and 8, the display apparatus 200 includes a cover 231; the display module 211 which is installed in the cover 231 to display an image; and a transmitter 41 which is installed inside of the cover 231 to transmit to shutter glasses 90 a synchronization signal for synchronizing the image displayed through the display module 211 with the shutter glasses 90.

More generally, the display apparatus 200 may include a display unit 210 for forming and displaying an image; a main body unit 260 which accommodates interior components such as a variety of boards for outputting power and an image signal; and a stand unit 290 which is installed between the display unit 210 and the main body unit 260 and supports the display unit 210.

As shown in FIGS. 7 and 8, the display unit 210 may include a cover 31; and a display module 211 which is installed in the cover 231 to display an image. The display unit 210 may further include a user input part 5 which is the same as in the first exemplary embodiment.

The display module 211 displays an image on the basis of an image signal processed in a driving circuit 264. The display module 211 may include a display panel 212; a backlight unit 213 which emits light toward the display panel 212; and a rear chassis 221 which is installed in back of the backlight unit 213.

The rear chassis 221 forms a rear appearance of the display unit 210. That is, the rear chassis 221 is coupled with the cover 231 by means of screws 223 or the like to form a rear part of the display unit 210.

The cover 231 is formed with an opening part 233 through which an image displayed through the display module 211 is exposed to the outside. On a rear surface of the cover 231 may be provided a module support bracket 235 which supports the display module 211; and a transmitter mount 237 to which the transmitter 41 is mounted. Further, on the rear surface of the cover 231 may be mounted a remote control receiver 47 which receives a control signal outputted from a remote controller (not shown), by means of screws 38. Further, on the rear surface of the cover 231 may be installed a user input board 45 corresponding to the user input part 5 by means of screws 38. According to the present exemplary embodiment, two module support brackets 235 may contact and support upper and lower edges of a rear surface 219 of the backlight 213 at a first surface thereof, and may be coupled with the rear surface of the cover 231 at a second surface thereof. The configuration of the transmitter mount 237 is similar to that of the first exemplary embodiment shown in FIG. 2.

As shown in FIG. 7, in a lower side of the cover 231 may be formed a transmitter penetration hole 7 through which the transmitter 41 transmits a synchronization signal, and a receiver hole 9 through which the remote controller 47 receives a control signal outputted from the remote controller, similarly to the exemplary embodiment shown in FIG. 1.

The transmitter 41 transmits a synchronization signal to the shutter glasses 90 so that a left eye shutter 93 and a right eye shutter 95 of the shutter glasses 90 can be opened and closed in synchronization with an image displayed on the display panel 212 of the display module 211. As shown in FIG. 8, the transmitter 41 may be installed on a lower side region of the rear surface of the cover 231, and correspondingly, the transmitter mount 237 may be provided in a lower side region of the rear surface of the cover 231. Configurations of the transmitter 41 and the shutter glasses 90 are similar to those of the exemplary embodiment shown in FIGS. 1 to 5.

The transmitter 41 may be electrically connected with the driving circuit 264 through a transmitter cable 43. A cable accommodating part 44 may be provided in a lower region of the rear surface of the cover 231, or may be provided in another region such as a side region of the rear surface of the cover 231. The transmitter cable 43 may be coupled with a panel driving board 251 to be described later by passing through the rear chassis 221. The transmitter cable 43 may be provided as a variety of types such as a wire or a flexible printed circuit board.

The backlight unit 213 according to the present exemplary embodiment includes a light source 215 which emits light to the display panel 212, a light guide plate 218 which uniformly supplies the light emitted from the light source; and an optical sheet (not shown) including a diffusing film which is disposed in front of the light guide plate 218 to diffuse the light supplied from the light guide plate 218 and a prism film. The backlight unit 213 further includes a reflection sheet 219 which is provided in back of the light guide plate 218 to reflect the light emitted from the light source 215 toward the display panel 212.

The light source 215 may include, for example, an LED, and may be provided as an edge type in which the light source 215 is installed on at least one side surface of the light guide plate 218. That is, the light source 215 may be installed on one side surface of the light guide plate 218, on opposite side surfaces thereof, or on three or four side surfaces thereof. Alternatively, the light source 215 may be provided as a direct type in which the light source 215 is installed on a rear surface of the light guide plate 218. In the case of the edge type, an inclined reflection sheet (not shown) may be used in place of the light guide plate 218. In this case, the light emitted from the light source 215 may be directly reflected from the inclined reflection sheet toward the display panel 212.

The light source 215 according to the present exemplary embodiment may include an LED 216, and an LED substrate 217 which supports the LED 216. The light source 215 may be provided as a linear light source such as a CCFL or EEFL, or a point light source such as CNT. The LED substrate 217 may be supported by an LED substrate support 236 which is provided in the cover 231. Heat generated in the LED 216 may be radiated through the LED substrate support 236. The LED substrate 217 may be mounted with the plurality of LEDs 216, and may be made of metal having high thermal conductivity. Electrodes for connecting the respective LEDs 216 may be patterned on the inside or outside of the LED substrate 217. To the LED substrate 217 is electrically connected an LED cable 238. An LED cable guide 239 may be formed in a side surface of the LED substrate support 236 along the edge of the cover 231, to accommodate the LED cable 238.

According to the present exemplary embodiment, as shown in FIG. 8, the panel driving board 251 is mounted on a rear surface of the rear chassis 221 of the display unit 210.

The panel driving board 251 may be provided with a timing controller for controlling time difference generated when an image signal inputted from the main body unit 260 to be described later is displayed through the display panel 212.

To the panel driving board 251 is mounted a display connector 255. Further, to the panel driving board 251 are connected an image cable 253 and a power cable 254 which supplies an image signal transmitted through the display connector 255 and electric power to the display panel 212 and the backlight unit 213. A board cover 257 may be installed on the rear surface of the rear chassis 221 to cover the panel driving board 251.

In the board cover 257 is formed a display connector exposing part 259 through which the display connector 255 mounted to the panel driving board 251 is exposed to the outside.

According to a modified exemplary embodiment, the panel driving board 251 may be arranged between the reflection sheet 219 of the backlight unit 213 and the rear chassis 221. In this case, a region of the rear chassis 221 to which the panel driving board 251 is mounted may be protruded in a rear direction, and the display connector exposing part 259 may be formed in the rear chassis 221. In this case, the board cover 257 may be removed.

As shown in FIGS. 9 to 12, the main body unit 260 of the display apparatus 200 according to present exemplary embodiment includes a main body casing 261 which forms an outside appearance; a power board 265 which is installed inside of the main body casing 261 and is provided with a power source 264; and a main board 267 which is installed inside of the main body casing 261 and is provided with an image processing part 285. The main body unit 260 may include at least one of a tuner 282 for receiving a broadcast signal supplied from a broadcasting station and an external signal receiving part 283 for receiving an image signal from an external device such as a DVD (Digital Versatile Disk). The main body unit 260 may further include a speaker 271. Further, the main body unit 260 may serve as a base which is put on an installation surface and supports the display unit 210 and the stand unit 290, similarly to the base 75 of the exemplary embodiment shown in FIG. 6.

The main body casing 261 may have a rectangular shape with a predetermined height. The components installed inside of the main body casing 261 may be preferably but not necessarily arranged in the same plane so that the height of the main body casing 261 can become as small as possible. To an upper part of the main body casing 261 may be installed a main body cover 262. At least a side wall of the main body casing 261 may be opened so that sound from the speaker 271 and a woofer speaker 273 can be outputted. A filter member 261a may be installed in the opening to prevent foreign substances from being entered. Further, in at least one side wall of the main body casing 261 may be formed a plurality of cooling holes 261b through which air inside of the main body casing 261 exchanged with outside air for cooling. The cooling holes 261b may be formed in a bottom of the main body casing, in addition to or in place of the at least one side wall.

In the main body cover 262 is formed a main body connector exposing part 263 through which a main body connector 275 is exposed. The main body cover 262 may be coupled with the main body casing 261 by means of screws 264, which are screw-coupled with coupling parts 262b of the main body casing 261 through coupling holes 262a. Alternatively, the main body cover 262 may be coupled with the main body casing 261 by a variety of means such as hook coupling.

The main board 267 is mounted with the tuner 282, the external signal receiving part 283, an image processing part 285, and a controller 288. The main board 267 may be mounted with a variety of connection ports such as a CI (Common Interface) slot 269.

The image processing part 285 processes a broadcast signal received through the tuner 282 or an image signal received from an external device such as a DVD to be displayed through the display unit 210. The image processing part 285 may include a scaler 286 for scaling the image signal to correspond to resolution of the display unit 210. The scaler 286 may perform adjustment of vertical frequency, resolution, picture ratio, etc. with respect to a received digital image signal and/or an analog image signal to correspond to an output standard of the display unit 210. Further, the image processing part 285 may perform a variety of functions such as A/D converting, digital decoding and format converting.

With this configuration, the display apparatus 200 according to the present exemplary embodiment can output the image signal scaled by the scaler 286 of the image processing part 285 to the display unit 210 through the main body connector 275 and the display connector 255.

The power source 264 mounted on the power board 265 supplies electric power to the main body unit 260 and the display unit 210. For example, the power source 264 may supply electric power to components such as a display panel 212 and a backlight unit 213 of the display unit 210 through the main body connector 275 and the display connector 255. According to this configuration, since a separate connection means for power supply other than a connection unit for transmitting an image signal is unnecessary, the display unit 210 can be provided in a simplified and slim manner. The power board 265 is arranged on the main body casing 261 in the same plane with respect to the main board 267 and the woofer speaker 273.

The speaker 271 may be installed in a front region of the main body casing 261 so that sound can be outputted in a front direction. Alternatively, the speaker 271 may be installed in a different region such as a rear region or a side region of the main body casing 261.

The woofer speaker 273 may be arranged adjacent to the speaker 271 in front of the main board 267 inside of the main body casing 261.

Figure 9:
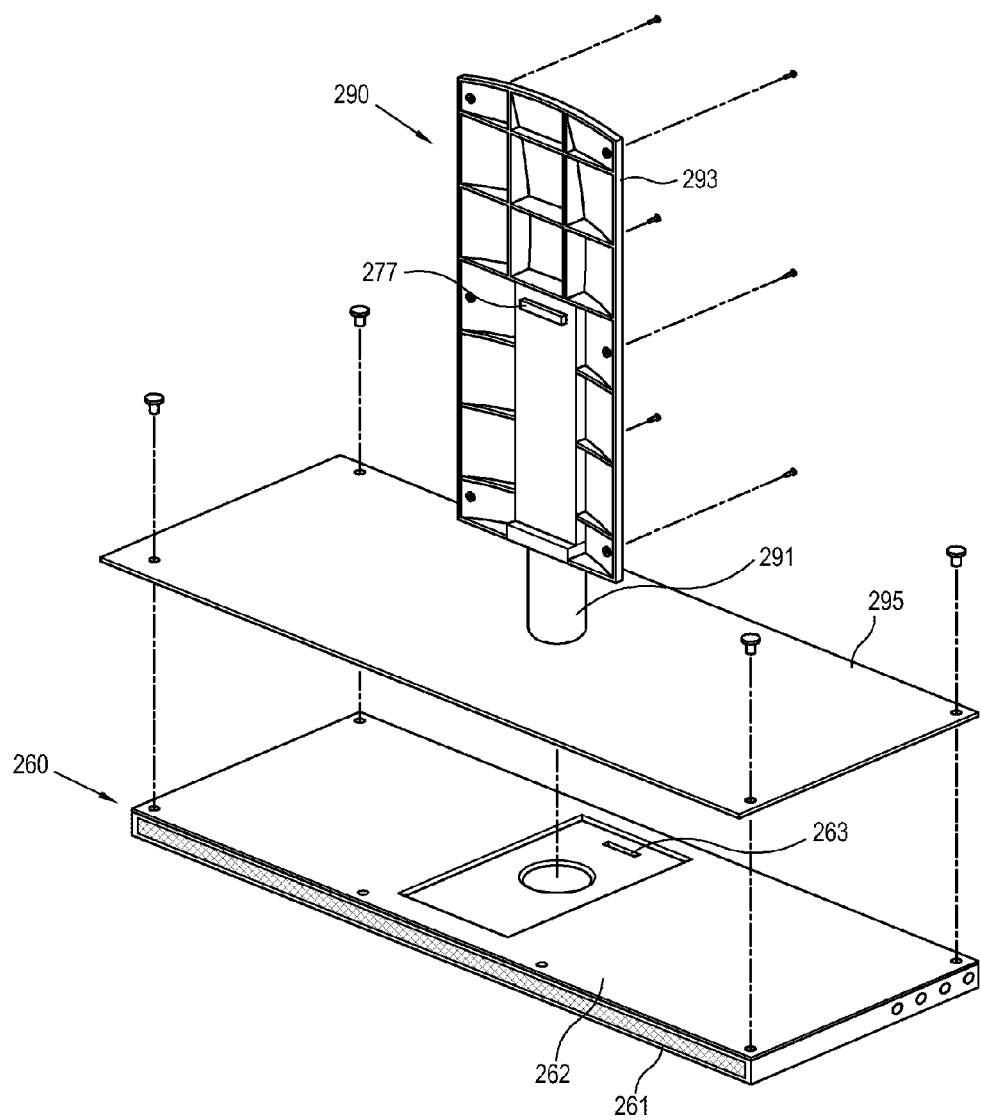
FIG. 9 is a perspective view illustrating a stand unit and a main body unit in the display apparatus, an example of which is shown in FIG. 7.
Figure 10:
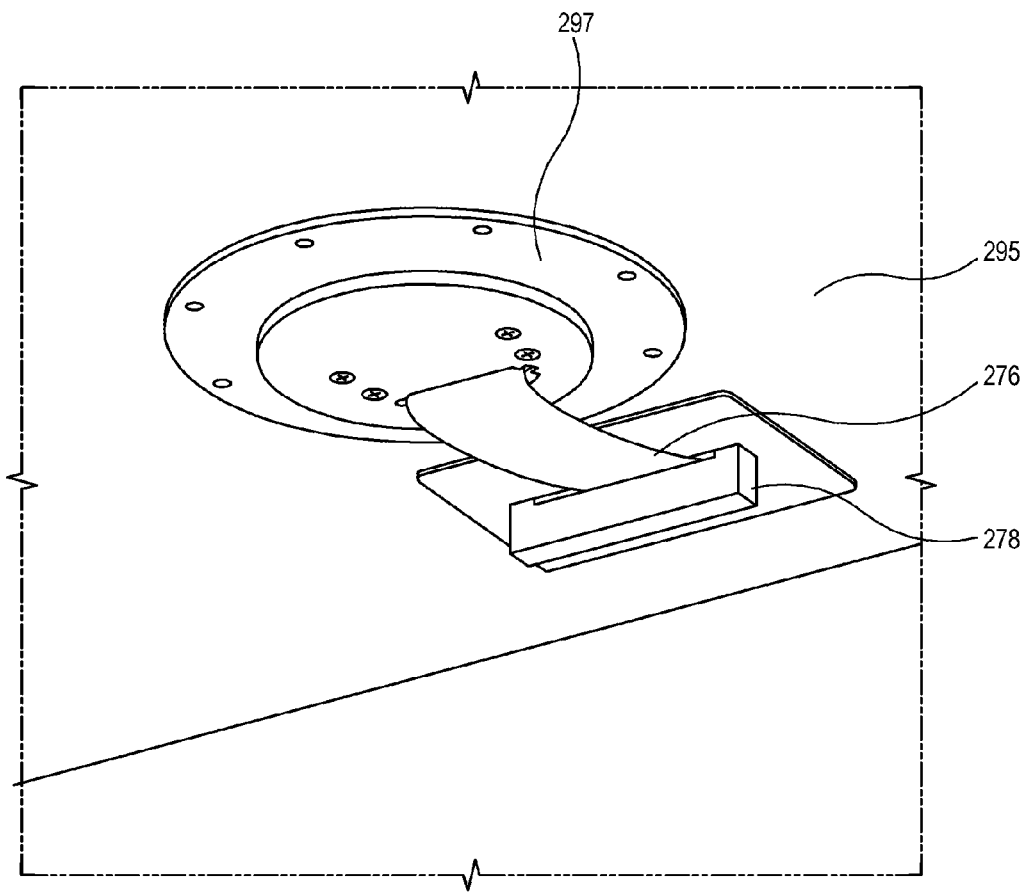
FIG. 10 is a bottom perspective view illustrating the stand unit, an example of which is shown in FIG. 9.
Figure 11:
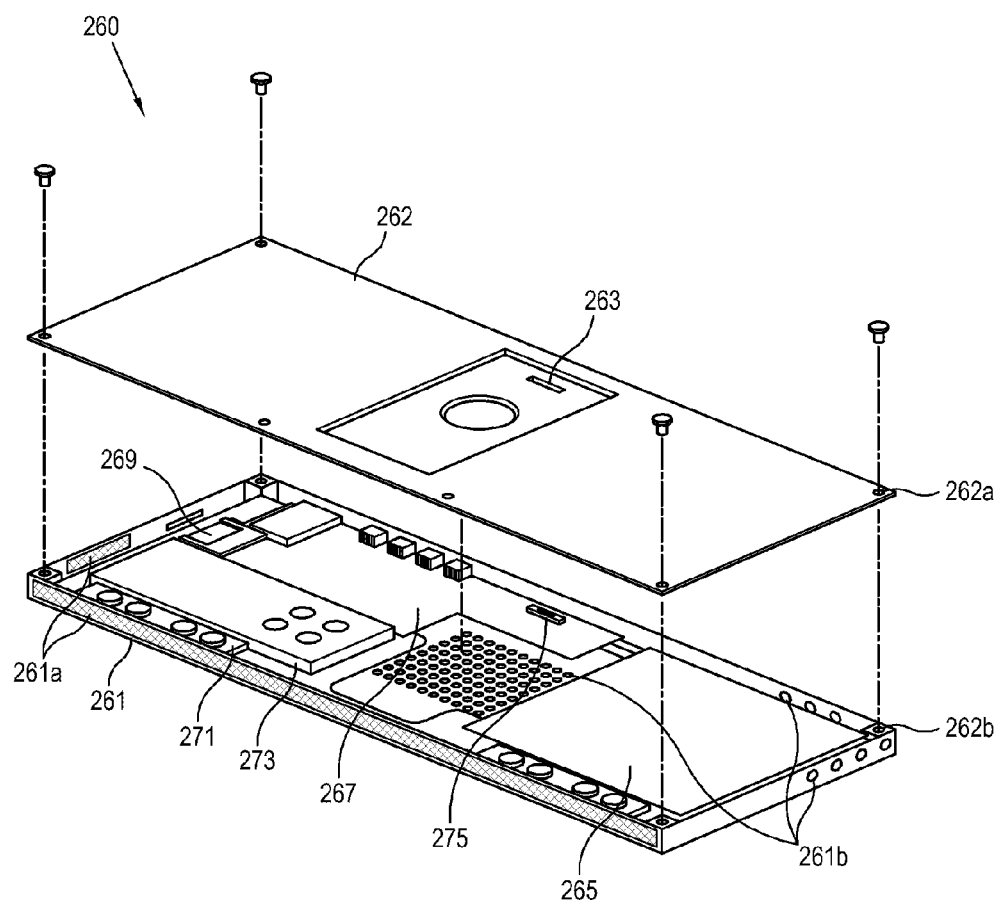
FIG. 11 is an exploded perspective view illustrating the main body unit, an example of which is shown in FIG. 9.
Figure 12:
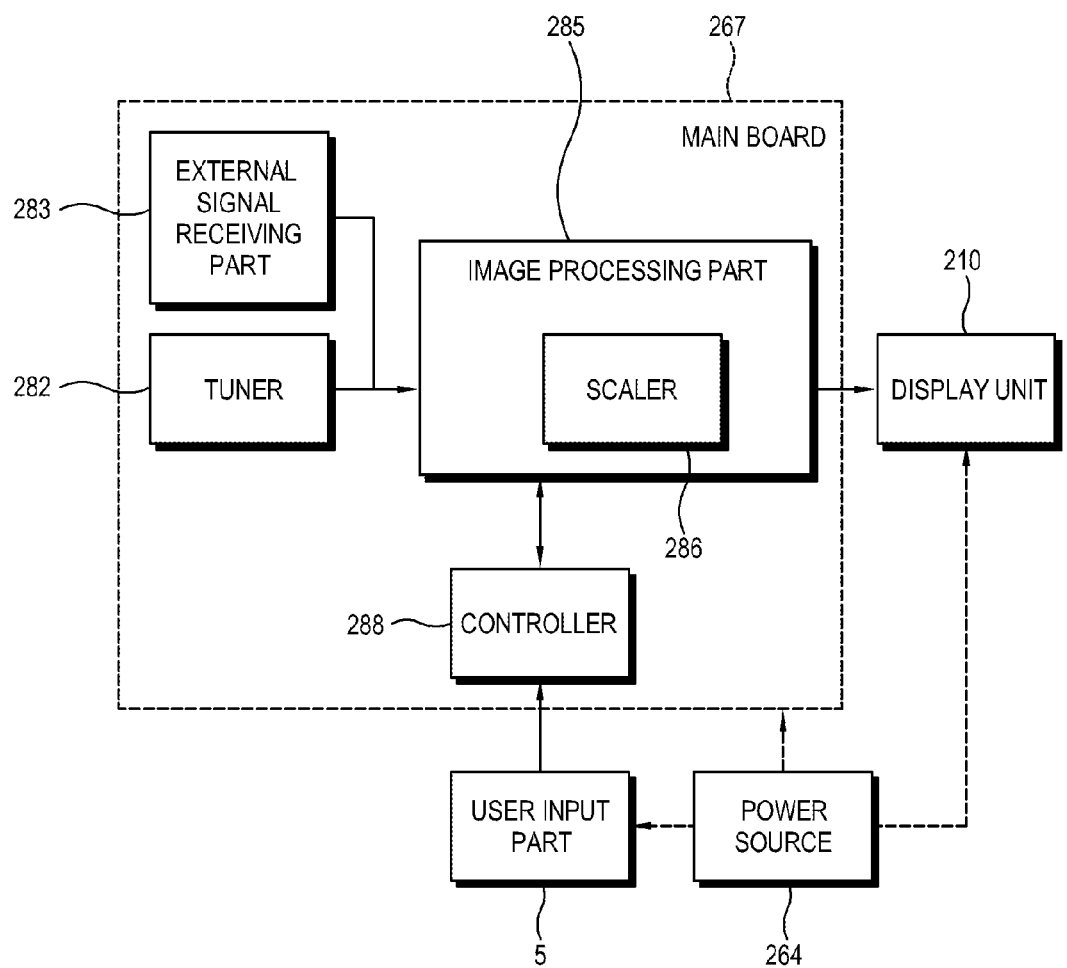
FIG. 12 is a control block diagram illustrating the display apparatus, an example of which is shown in FIG. 7.

As shown in FIGS. 9 to 11, the connection unit may further include a connection cable 276 which connects the display connector 255 to the main body connector 275. With this configuration, the display apparatus 200 according to the present exemplary embodiment can transmit the image signal and power supplied from the main body 260 to the display unit 210 through main body connector 275, the connection cable 276 and the display connector 255, thereby realizing a simplified configuration and providing convenient coupling and decoupling.

As described above, the display connector 255 is mounted on the panel driving board 251 and is exposed through the display connector exposing part 259 which is formed in the cover 257; and the main body connector 275 is mounted on the main board 267 inside of the main body casing 261 and is exposed through the main connector exposing part 263 which is formed in the main body cover 262. The connection cable 276 includes at opposite end part thereof a first connector 277 and a second connector 278 which are configured to be connected with the display connector 255 and the main body connector 275, respectively. The connection cable 276 may be installed inside of the stand unit 290. That is, the connection cable 276 may be installed inside of the stand unit 290 so that the first and second connectors 277 and 278 can be connected with the display connector 255 and the main body connector 275, respectively. Thus, the connection cable 276 can be prevented from being exposed outside, thereby simplifying the appearance.

As described above, the display apparatus 200 according to the present exemplary embodiment may further include the stand unit 290 the display unit 210 with respect to the main body unit 260 which is put on an installation surface such as a table. As shown in FIG. 9, the stand unit 290 is vertically coupled with the main body unit 260 at a lower side thereof and is coupled with the display unit 210 at an upper side thereof, to thereby support the display unit 210 with respect to the main body unit 260. To this end, the stand unit 290 includes a display support 293 which is coupled with the display unit 210; a main body support 295 which is coupled with the main body cover 262 of the main body unit 260; and the stand member 291 which is coupled with the display support 293 and the main body support 295.

According to the present exemplary embodiment, the stand member 291 may have a tube shape with a predetermined length. The connection cable 276 passes through the tubular stand member 291. The stand member 291 is coupled with the display support 293 at an upper end part thereof and is vertically coupled with the main body support 295 at a lower end part thereof. The stand member 291 may be made of a variety of materials such as metal or plastic having such strength as to support the weight of the display unit 210.

The display support 293 has approximately a plate shape to be coupled with the rear chassis 221 of the display unit 210 by means of screws 296 or the like. A lower region of the display support 293 is coupled with the upper end part of the stand member 291. The display support 293 may be made of a variety of materials such as plastic or metal. The display support 293 is mounted with the first connector 277 of the connection cable 276 so that when the display support 293 is coupled with the rear chassis 221 of the display unit 210, the first connector 277 of the connection cable 276 can be connected with the display connector 255.

The main body support 295 is arranged on the main body cover 262 and is coupled with the main body cover 262 or the main body casing 261 through a stand support bracket 297 by means of screws or the like. The main body support 295 may be made of a variety of materials such as metal or plastic so as to maintain the vertical coupling of the stand member 291. The main body support 295 is mounted with the second connector 278 of the connection cable 276 so that when the main body support 295 is coupled with the main body cover 260 of the main body unit 260, the second connector 278 of the connection cable 276 can be connected with the main body connector 275.

Figure 13:
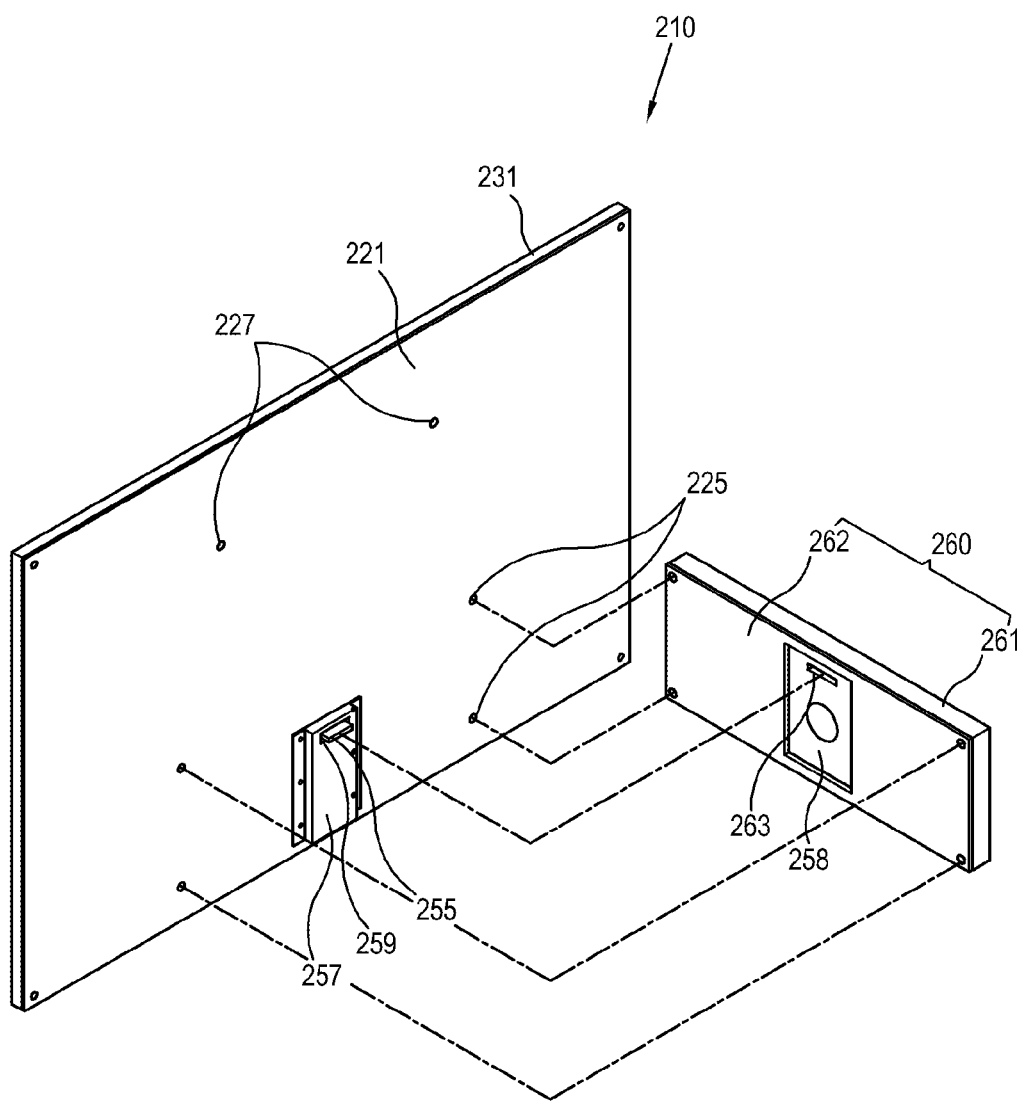
FIG. 13 is a perspective view illustrating a state that a main body unit is coupled with a display unit in the display apparatus, an example of which is shown in FIG. 7.

FIG. 13 is a perspective view illustrating a display apparatus according to a modified exemplary embodiment. As shown in FIG. 13, the main body unit 260 is directly coupled with the display unit 210, without the stand unit 290 of the exemplary embodiment as shown in FIGS. 7 to 11. That is, in this exemplary embodiment, the main body connector 275 of the main body unit 260 is directly connected with the display connector 255 of the display unit 210. In this case, the main body unit 260 is coupled with main body coupling parts 225 which are provided in the rear surface of the display unit 210 by means of screws or the like. The display connector 255 is exposed from the rear surface of the display unit 210 in a rear direction and the main body connector 275 is exposed from the main body unit 260 toward the display unit 210, so that the display connector 255 and the main body connector 275 can be easily connected with each other.

The main body cover 262 of the main body unit 260 may be formed with a board cover accommodating part 258 for accommodating the board cover 257 which is coupled with the rear chassis 221. Thus, when the main body unit 260 is coupled with the display unit 210, the board cover 257 which is coupled with the rear surface of the display unit 210 may be accommodated in the board cover accommodating part 258 of the main body unit 260.

The display apparatus as shown in FIG. 13 can be installed on a standing installation surface such as a wall. To this end, the rear chassis 221 of the display unit 210 may be provided with an installation part 227 such as a stud so that the display apparatus can be installed on the standing installation surface using a wire or the like. Further, the display apparatus according to the present exemplary embodiment may be installed on the standing installation surface using a variety of wall-mounting jigs. A lower end part of the main body unit 260 may be arranged in a location which is equal to or higher than that of the display unit 210. Thus, when a user sees the display unit 210 in front of the display apparatus, the main body unit 260 is prevented from being exposed to the user, thereby simplifying the appearance.

Figure 14:
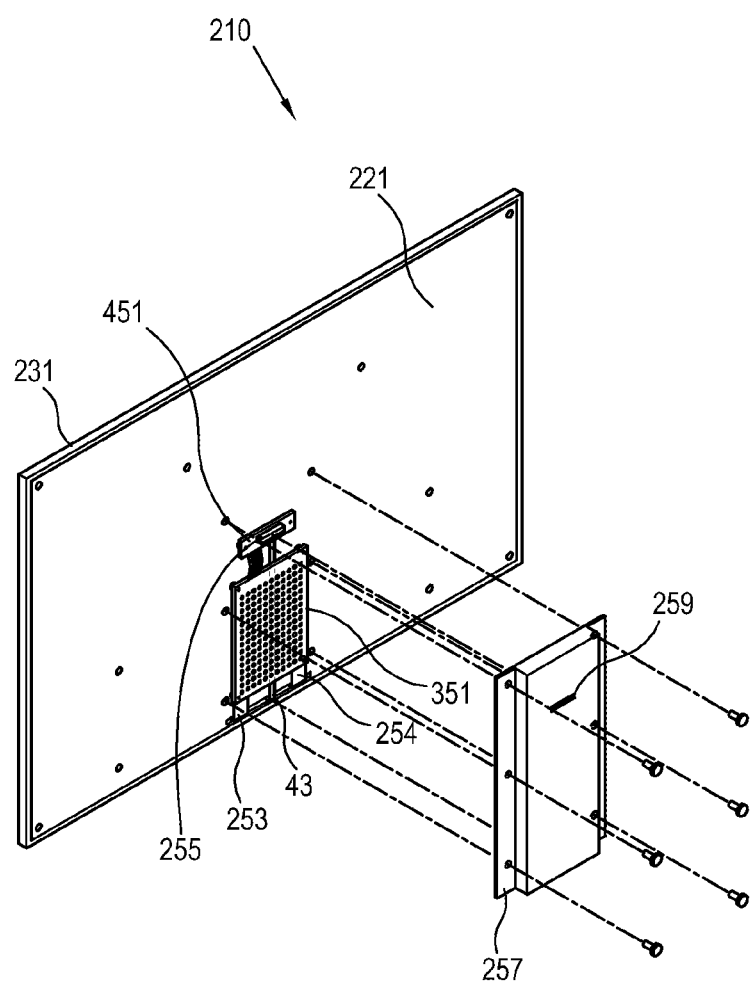
FIG. 14 is a perspective view illustrating another example of a panel driving board of a display unit in the display apparatus, an example of which is shown in FIG. 7.

FIG. 14 is a perspective view illustrating a display apparatus according to another modified exemplary embodiment. In the display apparatus shown in FIG. 14, the display connector 255 of the display unit 210 is mounted on a separate connector board 451, differently from the panel driving board 251 on which the display connector 255 is mounted as shown in FIG. 8.

The display unit 210 includes a timing controller board 351 which supports a timing controller for controlling time difference generated when an image signal inputted from the image processing part 285 is displayed through the display panel 212; and the connector board 451 which supports the display connector 255.

The connector board 451 is configured to transmit electric power and an image signal, etc. supplied through the display connector 255 to the timing controller board 351 and the backlight unit 213, etc. As shown in FIG. 14, the connector board 451 may be installed on the rear chassis 221 of the display unit 210 above the timing controller board 351, or may be arranged besides or under the timing controller board 351. The connector board 451 and the timing controller board 351 may be coupled with the rear chassis 221 by coupling screws 355 with coupling parts such as PEM nuts 353 which are mounted in the rear chassis 221. The timing controller board 351 may be installed into the rear chassis 221 to be spaced from the rear chassis 221. The distance between the timing controller board 351 and the rear chassis 221 may be approximately 3~5 mm, or may be smaller than 3 mm or larger than 5 mm. The transmitter cable 43 which is connected with the transmitter 41 may pass through the spacing between the timing controller board 351 and the rear chassis 221 and then is connected with the connector board 451. Alternatively, the transmitter cable 43 may be arranged beside the timing controller board 351 to be connected with the connector board 451.

With this configuration, in the display apparatus shown in FIG. 14, the timing controller board 351 and the connector board 451 can be independently and simply manufactured.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A flat display apparatus in which a user can view a three-dimensional (3D) image using shutter glasses, the apparatus comprising:
    a cover;
    a flat display module which is disposed in the cover and displays an image;
    a flat-plate shaped transmitter which is disposed in the cover and transmits a synchronization signal to the shutter glasses to synchronize the image displayed by the flat display module with the shutter glasses;
    a driving circuit which processes an image signal to drive the flat display module;
    a stand unit which supports the cover and the flat display module; and
    a base which supports the stand unit,
    wherein the cover comprises a front cover member which covers a front part of the flat display module and a rear cover member which covers a rear part of the flat display module, the front cover member comprising a transmitter mount to which the flat-plate shaped transmitter is mounted, such that a rear surface of the mounted flat-plate shaped transmitter is substantially flush with a rear side of the front cover member,
    wherein the transmitter mount comprises a groove recessed from a rear side of the front cover member and a synchronization signal passing hole disposed within the groove,
    wherein the transmitter mount is disposed within a thickness of the front cover member extending from the rear side of the front cover member to a front side of the front cover member,
    wherein the base is provided as a main body unit which accommodates at least a portion of the driving circuit,
    wherein the driving circuit comprises:
        a power board which supplies electric power to the flat display module; and
        a main board which processes the image signal and supplies the processed image signal to the flat display module, and
    wherein the power board and the main board are accommodated in the main body unit.

2. The flat display apparatus according to claim 1, the apparatus further comprising:
    a transmitter cable which electrically connects the driving circuit with the flat plate-shaped transmitter,
    wherein the front cover member includes a cable accommodating part which accommodates at least a portion of the transmitter cable.

3. The flat display apparatus according to claim 1, wherein the flat plate-shaped transmitter is disposed at a lower region of the cover.

4. The flat display apparatus according to claim 1, the apparatus further comprising:
    a remote control receiver which is disposed inside of the cover and receives a control signal from a remote controller,
    wherein the flat plate-shaped transmitter is provided integrally with the remote control receiver.

5. The flat display apparatus according to claim 1, the apparatus further comprising:
    a transmitter cable which connects the driving circuit with the flat plate-shaped transmitter,
    wherein a cable accommodating part which accommodates the transmitter cable is provided inside of the cover.

6. The flat display apparatus according to claim 1, wherein the groove recessed from the rear side of the front cover member comprises a planar surface recessed portion, the planar surface disposed toward the front side of the front cover member.

7. The flat display apparatus according to claim 6, wherein the transmitter mount further comprises couplers disposed in the planar surface recessed portion, and
    wherein the flat plate-shaped transmitter is directly attached to the front cover member via the couplers.

8. A flat display apparatus which displays images for viewing with shutter glasses, the apparatus comprising:
    a cover;
    a flat display module which is disposed in the cover and displays an image;

a flat-plate shaped transmitter which is disposed in the cover and transmits a synchronization signal to synchronize the image displayed by the flat display module with the shutter glasses;

a remote control receiver which is disposed inside of the cover and receives a control signal from a remote controller, wherein the remote control receiver and the transmitter are disposed separately inside the cover;

a driving circuit which processes an image signal to drive the flat display module;

a stand unit which supports the cover and the flat display module; and a base which supports the stand unit, wherein the cover comprises a front cover member which covers a front part of the flat display module and a rear cover member which covers a rear part of the flat display module, the front cover member comprising a transmitter mount to which the flat-plate shaped transmitter is mounted, such that a rear surface of the mounted flat-plate shaped transmitter is substantially flush with a rear side of the front cover member, wherein the transmitter mount comprises a groove recessed from a rear side of the front cover member and a synchronization signal passing hole disposed within the groove, wherein the transmitter mount is disposed within a thickness of the front cover member extending from the rear side of the front cover member to a front side of the front cover member, wherein the base is provided as a main body unit which accommodates at least a portion of the driving circuit, wherein the driving circuit comprises:
 a power board which supplies electric power to the flat display module; and
 a main board which processes the image signal and supplies the processed image signal to the flat display module, and wherein the power board and the main board are accommodated in the main body unit.

9. The flat display apparatus according to claim 8, wherein the flat plate-shaped transmitter and the remote control receiver are provided at a lower region of the cover.

10. A display apparatus in which a user can view a three-dimensional (3D) image using shutter glasses, the apparatus comprising:

a cover;

a display module which is disposed in the cover and displays an image;

a flat-plate shaped transmitter which is disposed in the cover and transmits a synchronization signal to the shutter glasses to synchronize the image displayed by the display module with the shutter glasses;

a driving circuit which processes an image signal to drive the display module;

a stand unit which supports the cover and the display module; and a base which supports the stand unit, wherein the cover comprises a front cover member which covers a front part of the display module and a rear cover member which covers a rear part of the display module, the front cover member comprising a transmitter mount to which the flat-plate shaped transmitter is mounted, such that a rear surface of the mounted flat-plate shaped transmitter is substantially flush with a rear side of the front cover member, wherein the transmitter mount comprises a groove recessed from the rear side of the front cover member and a synchronization signal passing hole disposed within the groove, wherein the transmitter mount is disposed within a thickness of the front cover member extending from the rear side of the front cover member to a front side of the front cover member, wherein an area of each of the rear surface and a front surface opposite the rear surface of the flat-plate shaped transmitter are larger than areas of other sides of the flat-plate shaped transmitter, wherein the base is provided as a main body unit which accommodates at least a portion of the driving circuit, wherein the driving circuit comprises:
 a power board which supplies electric power to the display module; and
 a main board which processes the image signal and supplies the processed image signal to the display module, and wherein the power board and the main board are accommodated in the main body unit.

* * * * *